Nov. 1, 1932.   E. E. LITTLEFIELD   1,885,846
VALVE AND ITS OPERATION
Filed Oct. 4, 1926   2 Sheets-Sheet 1
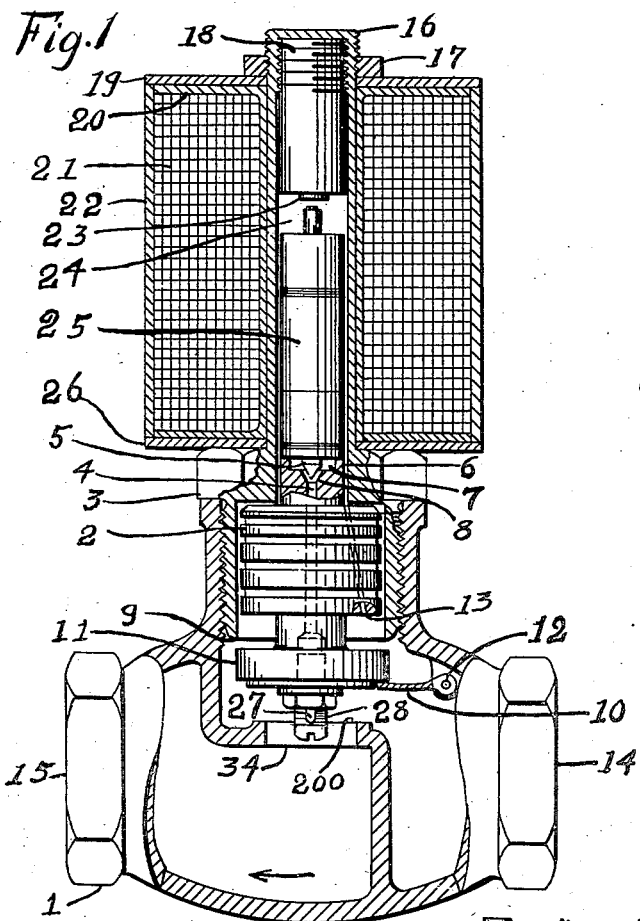
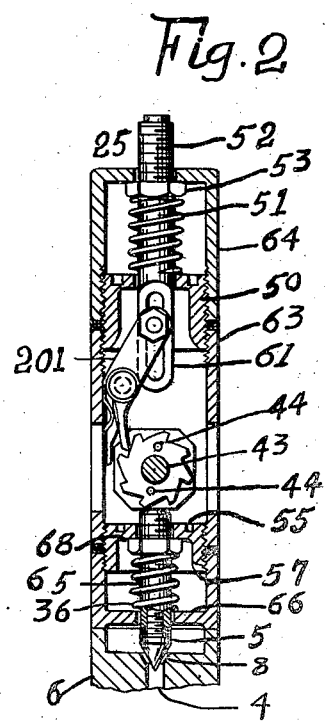
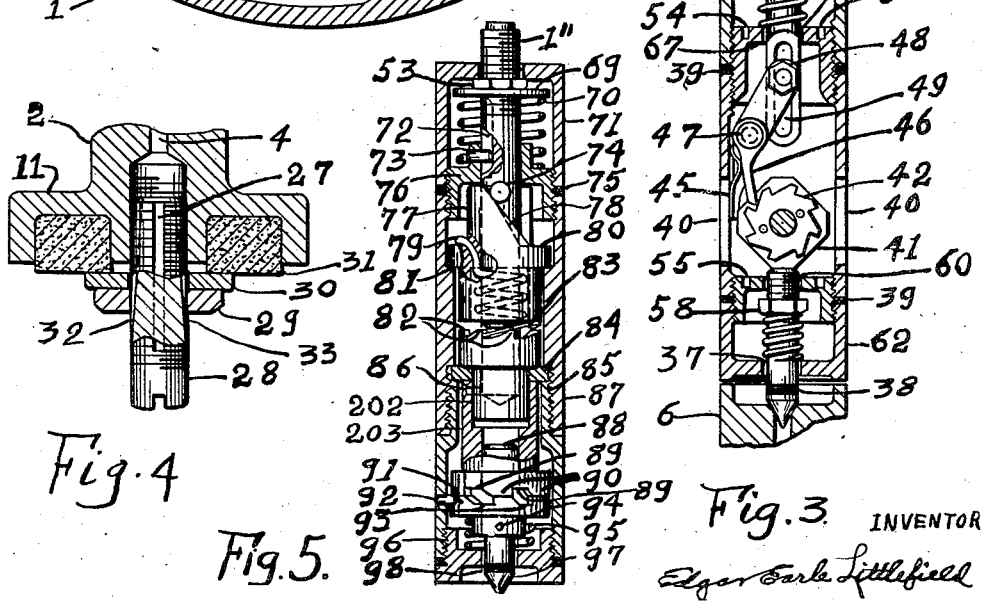
INVENTOR
Edgar Earle Littlefield

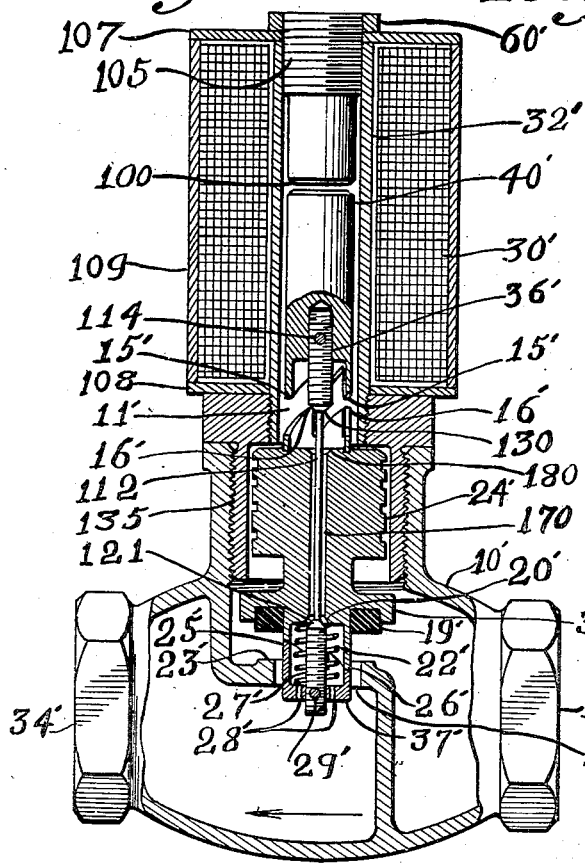
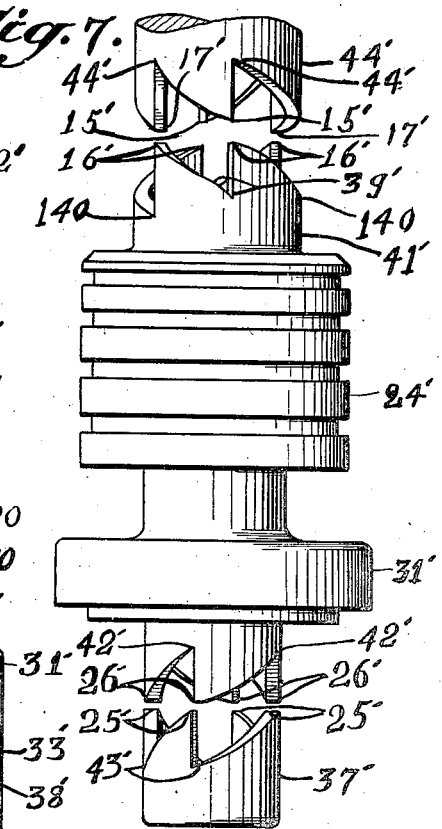
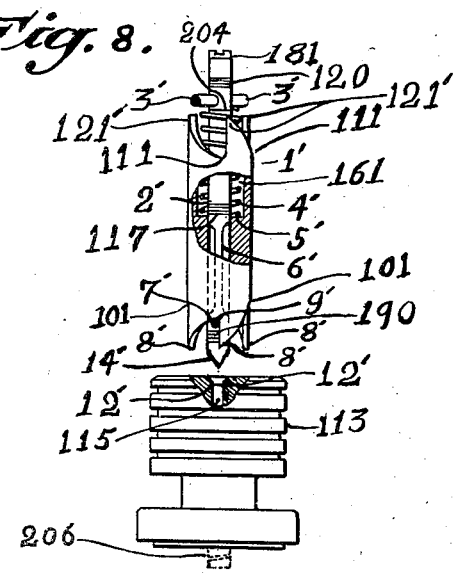
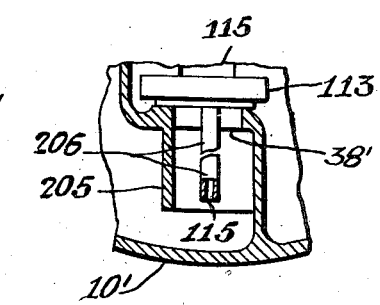

Patented Nov. 1, 1932

1,885,846

UNITED STATES PATENT OFFICE

EDGAR EARLE LITTLEFIELD, OF LOS ANGELES, CALIFORNIA

VALVE AND ITS OPERATION

Application filed October 4, 1926. Serial No. 139,454.

Briefly considered this invention relates to improvements in valves designed to function on either alternating or direct current without overheating for the purpose of controlling or regulating various fluids supplied under different or varying pressure conditions.

As indicated above, one of the objects of this invention is to provide a device that will not overheat under service conditions. By the means I employ overheating is prevented in a very simple and practical manner and the current utilized reduced to a minimum.

Another object is to provide a valve the cost of which will permit of its adoption and use generally.

Another object is to provide a quick acting valve that will not stick and that will seat without an objectionable hammer blow.

Another object is to provide a valve the parts of which are not subjected to unnecessary strain or wear.

Another feature resides in the adjustability of certain elements making up the combination.

Another object is to provide a device that is economical in power consumption.

Other objects and advantages of my invention, in addition to compactness of assembly, economy in manufacture and installation, reliability of operation, the advantage consisting of few moving parts and delicacy of operation should be readily appreciated and suggest themselves as the invention becomes better understood by reference to the following description and accompanying drawings.

Referring to the drawings:

Fig. 1 is a side elevation, partly in section, of one embodiment of my invention.

Fig. 2 is a cross-sectional elevation of the ratchet or escapement device 25 showing the auxiliary valve 5 in a predetermined position.

Fig. 3 is a cross-sectional elevation of the device of Fig. 2 showing the auxiliary valve in another predetermined position.

Fig. 4 is a detail, partly in cross-sectional elevation, of the lower end of the plunger 2.

Fig. 5 is an elevation, partly in cross section, of a modified ratchet mechanism which may, if desired, be substituted for the element 25 of Fig. 1.

Fig. 6 represents another embodiment of my invention employing a modified form of ratchet mechanism. In this figure the valve is shown partly in cross-sectional elevation.

Fig. 7 is an enlarged view of a side elevation of certain of the elements included in the unit making up the ratchet mechanism.

Fig. 8 is an elevation, partly in section, of a co-acting unit employing another modified ratchet mechanism.

Fig. 9 is a view, partly in cross section, of a modified arrangement showing injector means for operating the piston.

Referring to the drawings more in detail and particularly to Fig. 1 I have supplied a valve casing 1, having inlet and outlet openings 14 and 15, respectively, and having a seat 200 formed on the upper side of a port 34. To close this port I have provided a mechanism including a pressure operated piston 2 having an extended flange 11 at its lower end to which is detachably secured, by means of a washer 30 and nut 29, a gasket, of any suitable material, and a threaded fluid regulating bolt 28 having grooves 27, 32 and 33 by means of which the flow of fluid through the by-pass 4 is regulated. This piston is mounted to reciprocate in a cylinder 9 consisting of a threaded extension of the valve bonnet 3. The piston is loosely mounted in the cylinder so that when the former is seated fluid will be permitted to enter chamber 24 above the upper surface of the piston thereby holding it on its seat following a closing of the by-pass 4. Additional means in the form of a duct 13 for allowing fluid to enter the upper chamber may be utilized as occasion requires. In most cases, however, this duct may be omitted. To apply a hammer blow, when desirable, to the lower end of the piston 2 an impact device 10 is swingably mounted at 12 to interior wall of the valve for assisting in unseating the piston when such fluids as have a tendency to cause the valve to stick are to be controlled. An extension of the wall of the valve bonnet 3 forms a sealed tubular member 16 constituting a hollow diamagnetic core for a solenoid and within which core, at the upper end, is secured a paramagnetic member preferably made of stainless iron or its equivalent. At the lower end of this paramagnetic member 18 is secured a disc 23 of brass, or the like, by means of which sticking is prevented. Forming one of the elements of the solenoid is a perforated disc of magnetizable material, preferably of stainless iron or its equivalent, 26, removably mounted on the extension of the bonnet. A companion disc 19 is removably mounted at the upper end of the tubular casing 22 of the solenoid, the elements 26, 22 and 19 being clamped in position by means of a nut 17 threaded on to the upper end of the imperforate extension of the valve bonnet. While the parts 26, 22 and 19 may be made of soft iron I prefer to form them of stainless iron or its equivalent since the former soon develops rust or other forms of corrosion under the various conditions of use. Around the imperforate extension of the valve bonnet and within the shell of the solenoid is detachably mounted a spool 20 containing a suitable winding 21. This arrangement provides simple and practical means by which the spool and associated parts may be removed, since removal may be effected merely by removing the nut 17. Since it is often desirable and many times necessary to substitute one coil for another the means I have provided renders it possible to effect this result in a very expeditious and economical manner. Within the chamber 24 I have movably mounted, on a tubular extension of the piston 2, a unit consisting of a ratchet or escapement mechanism the shell or casing of which consists of the three tubular magnetizable parts 62, 63 and 64 adjustably and detachably secured together by means of the shims 39 and the brass connecting members 57 and 50. The parts completing the casing are preferably made of stainless iron or its equivalent. The parts 57 and 50 are provided with slots 55 and 54 for the insertion of a suitable wrench to unscrew the same. In partitions 66, 68 and 67, formed by the parts 62, 57 and 50 respectively, as well as in the upper wall of the part 64, openings 56, 59, 60 and 37 are provided within which certain elements hereinafter described are arranged. At 40 I have provided openings for the circulation of fluid. Rotatably mounted on a pin 43 secured to the shell or casing is a cam member 41 on the side of which is rigidly secured by means of pins or screws 44 a ratchet wheel 42. Engaging the teeth of this ratchet is a pawl or detent 46 co-acting with a slidably mounted spring 45 forming an extension of a rigidly but adjustably mounted arm 201. With this arm the pawl 46 has a hinged connection at 47. By means of a bolt and nut 48 the arm 201 is adjustably and detachably mounted in a slot 49 of a push pin 52 resiliently mounted by means of the coiled spring 51 and the adjusting nut 53 in the openings previously described. Co-acting with the cam at its upper end is a brass pin 65 to the lower end of which is adjustably and detachably secured, by means of the shims 38 and the threads provided by the members, a brass or bronze auxiliary valve 5 arranged to co-act with a seat formed at the upper extremity of the by-pass 4. The pin 65 is resiliently mounted in the openings previously described by means of a coiled spring 36 and an adjusting nut 58.

From a consideration of the above description it will be apparent that when the pin 52 is pushed downwardly in such a way as to cause the pawl to engage the teeth of the ratchet 42 that rotational movement will be imparted to the latter. Since the ratchet and cam 41 rotate together it is obvious that rotation of the latter will cause reciprocating movement of the auxiliary valve 5. In other words, at each quarter turn of the cam the position of the auxiliary valve changes. In one position it will occupy its seat 8 thus closing the by-pass 4 and in this position it will support the unit 25 as illustrated in Fig. 3. In the other position it will be supported away from its seat by means of the casing as shown in Fig. 2 and while in this position the by-pass 4 will remain open. Since the by-pass 4 extends through the piston 2 it is clear that the auxiliary valve forms a convenient means for controlling the release of pressure from the upper chamber. Assuming now that the valve is connected with a source of fluid, such as air or water, for example, at 14, and that the pressure is around thirty pounds and the valve is closed. If the solenoid is now energized the unit 25 will be magnetically "sucked" upwardly in the chamber 24 the pin 52 striking the lower end of the magnetizable core member 18 causing the former to be pushed inwardly and operating the cam member in a manner previously described. If the solenoid is now de-energized the unit will drop to its previous position on the upper end of the extension 6 and the auxiliary valve will assume the position shown. In this position the valve will remain permanently open. Obviously, energizing and de-energizing the solenoid again will cause the auxiliary valve to assume a closed position with respect to its seat and in this position it will remain until the solenoid is again energized. Directing consideration to the impact member 10 if we assume that the main valve occupies its seat and that the by-pass 4 is now opened it will be found that the flow of fluid will cause the member 10 to strike the under surface of the piston tending to unseat the same. In numerous cases this impact member may be omitted. Since the theory of operation of a piston type of valve has been fully explained in my patent of June 21st, 1927, #1,633,217, it is not believed necessary to explain the functioning of the piston in the present case.

The device shown in Fig. 5 represents an embodiment that may, if desired, be substituted for the unit 25 with similar results. In this device the casing is made up of certain magnetizable members, preferably of stainless iron or its equivalent, consisting of the tubular elements 71, 87, 85 and 96 adjustably and detachably secured together by means of customary shims, only one set of which 75 is marked, and screw threads plus the tubular element 76. A brass pin 1" is passed through an opening in the upper wall of the member 71 and while being permitted to reciprocate is prevented from turning on its axis by means of a pin secured to the stationary member 76 and which pin occupies a longitudinal slot 72 of the reciprocating pin 1". Resilient means consisting of a coiled spring 70 and an adjusting nut 53 mounted above a washer 69. As the pin 1" is pushed inwardly a shoe 74, secured thereto, co-acts with the inclined plane 78 of a tubular element 80 having rotational movement around the pin. To support the element 80 a shoulder 81 is provided. As the element 80 is given a turning movement a detent or pawl in the form of a spring member 83, carried by the member 80, co-acts with the teeth 82 of a tubular element mounted to turn with a second tubular element 203 by means of a set screw 86. Extensions 90 on the lower end of element 203 engage recesses 93 on the upper side of a reciprocating member 91 provided with a longitudinal slot (not marked) in which a stationary screw 92 has engagement. To the lower end of a brass pin 88 is adjustably and detachably secured an auxiliary valve 97 by means of shims 98 and threads formed on the upper end of the auxiliary valve. This pin 88 is rigidly mounted by means of set screw 94 within the element 91 so that reciprocal movement imparted to the latter will impart like movement to the auxiliary valve. A coiled spring 95 exerts an upward tension on the part 91 to keep the same in engagement with the lower face of element 203. Recesses 89 co-act with extensions on the upper face of the element 91. A flat ring 84 seated on the upper end of the tubular element 85 provides a support for the rotating element 202. It will be understood that the element 80 moves through a fixed arc of a circle and is returned to its original position by the tension of a spring 79 the lower end of which enters a slot in the side of the pin 1". Elements 202 and 203, which are rigidly secured together, rotate in a circular manner around the axis of the pins 1" and 88 neither of which rotates. In actual practice the point of the auxiliary valve 97 extends a sufficient distance out to permit proper functioning. This may be accomplished by means of the shims 98, or their equivalent, or by the shims carried by the element 96. If this unit is now substituted for the element 25 and the solenoid energized the unit will function to produce a similar result. In other words, the upper end of the pin 1" will strike the lower end of the core member 18 causing the pin 1" to be pushed downwardly in the casing thus producing reciprocating movement of the auxiliary valve by means of the interposed mechanism. Obviously, when the member 203 is rotated the cogs or spurs on its lower perimeter will mesh with those on the upper extremity of the element 91 thus causing the auxiliary valve to be retracted. A further movement in the same direction will cause the cogs on the two parts to assume the position shown, thus forcing the auxiliary valve out. In one position the auxiliary valve will occupy the seat, supporting the other elements of the combination or unit while in the other position the auxiliary valve will be supported away from its seat.

In Fig. 6 I have shown a modified embodiment of my invention in which 10' is a valve body having inlet and outlet openings 33' and 34', respectively, the direction of fluid in this view, as well as in the other views, being in the direction of the arrow. A port 38' in a partition of the valve provides a seat 23' for a valve member forming a piston 24' adapted to reciprocate in a downwardly extended tubular portion 135 of the valve bonnet and having at its upper extremity an annularly arranged set of teeth 16' two companion sockets 39' being at a higher elevation than the other two indicated at 140. While the extension 41' may be made integral with the plunger or piston it may also be detachably arranged as indicated in Fig. 6. An annular flange 31' carries a gasket 19' arranged to co-act with the seat 23'. An annular extension of the lower end of the piston provides a set of teeth 26' having sockets 42' the upper extremity of which terminate in the same plane. Preferably there should be four of these teeth identical in form to get the best results although this number may be varied either way without seriously interfering with the functioning of the apparatus provided all other teeth are made to correspond. Longitudinally of this piston I have provided a by-pass 170 having seats 180 and 20' at its upper and lower extremity, respectively. By means of set screws 114 and 29' I have adjustably and detachably secured to the upper and lower ends, respectively, of a slender brass pin 112 two threaded members 36' and 27' provided with tapered valve elements 130 and 121. Adjustably and detachably secured to the element 27' is a cap shaped member 37′ having a set of annularly disposed teeth companion to those on the lower end of the piston and with which they are adapted to mesh. The upper extremity of these teeth, indicated at 25′ terminate in the same plane. Obviously, the sockets 43′ terminate in the same plane. Perforations 28′ permit circulation of fluid at all times except when it is desired to close the valve 121 which is necessary only under certain conditions as when it is desired to close the by-pass entirely. Ordinarily, however, this valve forms a simple means for regulating the flow of fluid through the by-pass. Detachably and adjustably secured to the element 36′ is a magnetizable armature or plunger 40′, preferably formed of stainless iron or its equivalent, having at its lower end an annularly disposed set of teeth companion to those on the upper end of the piston 24′. Two of these teeth, 15′, are at an elevation higher than the other two, 17′, but the upper point of the angles formed thereby may terminate in the same plane as indicated at 44′. While the element 41′, forming the companion or co-operating set of teeth, may be detachably secured to the upper end of the piston 24′ it should, if so arranged, be rigidly secured thereto to prevent turning movement, as by means of threads or a set screw. A sealed or fluid-tight chamber 11′, above the piston 24′, is formed by means of a brass or bakelite tube 32′ into the upper end of which is threaded a magnetizable plug 105, preferably formed of stainless iron, and which has a brass separator 100 secured to its lower face. A fluid tight joint between this tube and the valve bonnet is secured by threading the former into the latter in a perforation provided therefor. Included as the elements of a solenoid is a magnetizable shell or casing consisting of a tube 109, companion washers 107 and 108 (the perforation in the former being less in diameter than that of the latter), and a threaded nut 60 for clamping the members in place and making it possible to quickly disassemble the same. A spool of suitable wire 30′ forms a component part of the solenoid, the parts of which are designed and arranged substantially as shown. The magnetizable elements of the solenoid and valve are preferably formed of stainless iron or its equivalent while the remaining parts may be formed of any suitable non-magnetic material.

Assume that the above valve is connected at 33′ with a suitable source of fluid and that the solenoid is connected with a suitable source of electric current. Upon energizing the solenoid the armature 40′ will be pulled or "sucked" upwardly in the chamber 11′ and by operation of the companion teeth at the lower end of the piston be given a turning movement which in the present case will be a quarter turn. This operation also un-seats the valve 130 permitting fluid to escape from the chamber 11′ through the by-pass 170 and since the area of the piston portion of the main valve is somewhat larger than that which seats, the release of this pressure will cause the main valve to be unseated. If properly adjusted the lower extremity of the teeth on the lower end of the armature 40′ should at this time occupy such a position above the companion teeth on the upper end of the piston 24′ that in their downward movement they will contact about midway between the points of the latter. If the coil is now de-energized the action of gravity, together with that of the coiled spring 22′, will cause the teeth on the armature to contact with the teeth on the piston in the manner above explained causing a turning movement of the armature, resulting in the teeth 15′ lodging in the two companion sockets 140 or the two at a higher elevation indicated at 39′. Should they lodge in sockets 39′ the auxiliary valve will occupy its seat. Another turning movement, however, in the same direction will cause the teeth 17′ to drop into the sockets 39′ and since the teeth 17′ are longer, as it were, than the teeth 15′ the auxiliary valve will be supported away from its seat, thus opening the port 170 and permitting fluid to escape through the same. As previously related, the opening of the by-pass causes an unbalancing of the piston member and a functioning of the valve. Thus it will be seen that during the cycle of operations the auxiliary valve at one point is supported away from its seat by means of a set of teeth arranged at a certain elevation and at another point is lodged on its seat because the second set of teeth is arranged at such an elevation as not to be able to support it away from its seat, the operation depending, in part at least, upon a turning movement imparted to certain of the teeth.

In the modification shown in Fig. 8 the operation is similar to that above described. The combination illustrated in this view, including the unit 1′ and the piston combination just below it, may be substituted for corresponding elements illustrated in Fig. 6. In its substituted position the piston element 113 will, in the closed position of the valve, occupy the seat 23′ while the ratchet unit 1′ will rest upon the upper end of the same, the auxiliary valve 14′ at this time occupying its seat 12′ and closing the by-pass 115, extending longitudinally through the piston element. The form of piston and its operation will be familiar to those possessing knowledge of certain types of float valves. The metal parts of this piston element are preferably formed of non-magnetizable material. The unit 1′ is arranged in the chamber 11′ in position to reciprocate above the piston so that the auxiliary valve 14′ will at one time occupy its seat 12′ and close the by-pass 115 and at another time be supported away from its seat by means of the teeth 8'. The casing of the unit 1' is preferably made of stainless iron, or its equivalent, and at its lower and upper ends is provided with teeth 121' and 8' the former having a series of sockets 111 each corresponding in depth. I have found a set of four of these teeth, each identical in form, arranged as shown, satisfactory for all ordinary requirements although it will be understood that the number may be reduced or increased depending upon conditions. At the lower end of this casing the sockets formed by the teeth, preferably four in number, are arranged partially at one elevation and partially at another elevation. For instance, two of the sockets terminate in a horizontal plane 9' while the other two terminate in a similar plane at a higher elevation indicated at 101. The perpendicular edges of the lower teeth are preferably continuations of lines formed by the perpendicular edges of the upper teeth as shown, although other arrangements may be substituted. Obviously, the casing is provided with a bore provided with a shoulder 5', arranged in any convenient location, and within this bore a brass or bronze pin 2' is arranged to reciprocate to thereby cause the auxiliary valve 14', which is adjustably and detachably secured thereto by means of shims 190 and screw threads, to be pushed outwardly or retracted as the case may be. Engaging this shoulder 5' is a coiled spring 4' the upper end of which exerts tension against a brass or bronze cross-arm 3' so arranged in the upper end of the pin 2' that in the downward thrust of the pin the cross-arm will engage the inclined planes of two of the teeth 121' thereby causing a turning movement of the pin 2'. A similar cross-arm 7', carried by the pin 2', is arranged to co-act with the sockets of the teeth formed at the lower end of the casing. The length of the pin between the cross-arms may be adjusted by means of shims or the like shown at 117. The vertical position of the cross-arm 3' may be adjusted by inserting a screw 181 through upper sections of the pin 2' thus permitting the cross-arm to be turned on the pin at a point 204, for instance. Shims 120 may also be provided for purposes of adjustment. It will be understood that after adjustments are made the cross-arms are locked in rigid position in the pin so that when it is thrust downwardly the upper cross-arm will engage the inclined planes of two of the upper teeth and by rotational movement of the pin 2' cause the cross-arm 7' to move downwardly and past the points of two of the lower teeth so that in the upward movement of the pin 2' the lower cross-arm will engage the inclined planes of the latter teeth and be given a turning movement similar to that above described. Friction may be reduced somewhat by making these cross arms in the form of rollers, as shown. I have sometimes cut away a portion of the pin 2', as at 6', to provide a resilient action between the two cross arms but in actual practice, if proper adjustments are made, this expedient is unnecessary. Assuming that the valve is closed and that the solenoid is energized the unit 1' will move upward in the chamber 11' and the upper end of pin 2' will strike the lower end of the core 105 causing the cross arm 3' to be pushed into engagement with inclined planes of two of the teeth at the upper end of the casing and by the resilient connection with the lower cross arm cause it to pass the points of two of the lower teeth. If now the solenoid is de-energized the resilient action of the spring 4' will cause the cross-arm 7' to be retracted and lodged in the sockets terminating at the higher elevation or plane as at 101. De-energizing the solenoid causes the unit 1' to drop to its normal position in which it is supported by the piston 113 and with the cross-arm 7' in the position last described the casing will support the auxiliary valve 14' away from its seat and in this position the by-pass 115 will remain open until the solenoid is again energized and de-energized in which case the cross arm will lodge in the sockets 9', terminating at a lower elevation than those at 101, causing the auxiliary valve 14' to engage its seat 12' thus closing the by-pass 115. As indicated previously I prefer to form all the parts shown in Fig. 8 of non-magnetizable material except the casing or shell of the unit 1' and this should be made of magnetizable material, such as stainless iron or its equivalent, to permit magnetic co-action between the unit 1' and the other elements of the solenoid.

I have found that if the port 38' is provided with a tubular extension, indicated at 205 in Fig. 9, and the piston 113 is provided with a downwardly extending tubular portion 206, extended substantially to the lower end of the tubular extension of the port 38', that the operation of the device is very sensitive. In this case the action is substantially that of an injector, the flow of fluid, after the by-pass 115 is opened, creating a vacuum above the piston 113 causing it to be sucked upwardly in the chamber 11', it being assumed, of course, that one of the auxiliary valve controlling members, such as that shown in Fig. 8, is properly assembled in the combination. These extensions may be added, if desired, to make the device more sensitive. By reason of this increased sensitiveness it has been found possible in numerous cases to use a smaller by-pass, in which case a smaller auxiliary valve is required. Obviously, less power will be required to operate such a valve. I contemplate, also, that these extensions may be made adjustable in form, as by a telescoping arrangement and set screws, so that the sensitiveness may be adjusted. This principle may be applied to numerous types of valves besides those shown and described herein.

The principle embodied in the ratchet or escapement mechanism indicated at 1' in Fig. 8 may be utilized in many different ways and for as many different purposes. For instance, by making the pin 2' in the form of a shaft and providing a set of gears on the perimeter of the drum or casing the same may be made to turn and mesh with a second gear wheel. Besides other uses the method may be employed in connection with the operation of time pieces or typewriters, etc.

The various types of valves described constitute simple, economical and very practical means for controlling air, water or steam under various conditions of use and varying pressure conditions.

Like numerals refer to like elements.

In carrying my invention into practice I have found it preferable to have the auxiliary valve unit weigh less than the closure it controls. I, also, prefer to have it displace less fluid than the latter.

While in the foregoing I have illustrated and described typical forms of preferred embodiments whereby my invention may be carried into practice it will be understood that many modifications in the structure employed, as well as in the elements themselves, and in the application thereof, may be made without departing from the scope of the appended claims.

This application is a continuation, in part, of application 54,080 filed Sept. 2, 1925, now Patent #1,633,217 above referred to and those referred to therein.

I claim as my invention:

1. A combination including a valve casing having a seat; a closure at times supported by said seat; an auxiliary valve; latching means supportable by said closure designed to cause the auxiliary valve to assume an open position after it is de-energized; means for energizing and de-energizing the auxiliary valve.

2. A valve combination including an auxiliary valve mounted for rotational movement and electromagnetic means controlling said movement; a fluid operated valve having a by-pass controlled by said auxiliary valve, said electromagnetic means functioning to latch the auxiliary valve in open position, the auxiliary valve at times being supported by the fluid operated valve.

3. An electrically controlled valve combination including a valve casing having a seat; a closure at times supported by said seat; an auxiliary valve; escapement mechanism supportable by said closure designed to cause the auxiliary valve to assume an open position after it is de-energized; means for energizing and de-energizing the auxiliary valve.

4. An electrically controlled valve combination including a valve casing having a seat; a closure at times supported by said seat; an auxiliary valve; latching means supportable by said closure in the closed position of the latter designed to cause the auxiliary valve to assume an open position after it is de-energized; means for energizing and de-energizing the auxiliary valve.

5. An electrically controlled valve combination including a valve casing having a seat; a closure at times supported by said seat; an auxiliary valve; means at times supported by said seat designed to cause the auxiliary valve to assume an open position after it is de-energized; means for energizing and de-energizing the auxiliary valve.

6. In an electrically controlled auxiliary valve combination the combination of eccentric means so mounted as to control reciprocal movement of said auxiliary valve, the eccentric means at times being supported by the auxiliary valve; a fluid operated valve controlled by the auxiliary valve and at times supporting the latter.

7. The combination in an electrically operated valve structure having a fluid operated valve with a by-pass of an auxiliary valve and a stationary core member and means coacting with the core member to hold the auxiliary valve in an unseated position after the core member is de-energized; a seat arranged to support the weight of said fluid operated valve, the auxiliary valve at times being supported by said seat.

8. An electrically controlled valve combination including a valve casing having a seat; a closure at times supported by said seat; an auxiliary valve; latching means supportable by said closure designed to cause the auxiliary valve to assume an open position after it is de-energized; an impact device mounted to impart a hammer blow to said closure to cause the latter to unseat; means for energizing and de-energizing the auxiliary valve.

9. An electrically controlled valve combination including a casing having a pressure chamber with a seat therein arranged to support the weight of a fluid operated valve; an auxiliary valve mounted for reciprocal movement and rotatable escapement mechanism the rotation of which controls the position of the auxiliary valve with respect to its seat; a fluid operated valve within said chamber having a seat for an auxiliary valve, the seat that co-operates with the fluid operated valve when it is seated at times supporting the weight of the escapement mechanism.

10. An electrically controlled valve combination including a casing having inlet and outlet openings and a pressure chamber in communication with the inlet opening when communication through the valve is interrupted, said chamber having a seat therein arranged to support the weight of a closure; a closure responsive to the pressure condition in said chamber at times supported by said seat, said closure having a by-pass provided with a seat for an auxiliary valve; an auxiliary valve co-operating with said by-pass seat; means supportable by the auxiliary valve when it is closed designed to support the latter away from its seat.

11. A valve combination including a valve casing having a pressure chamber open to line pressure when communication through the valve is interrupted; a seat within said chamber arranged to support the weight of a closure; a closure responsive to the pressure condition in said chamber at times supported by said seat; means including an auxiliary valve and a co-operating armature controlling release of pressure from said chamber and for causing the auxiliary valve to assume an open position after deenergization of the armature, the auxiliary valve at times being supported by the closure; electrical means including a core member for controlling the armature.

12. A valve mechanism including a casing having inlet and outlet openings and having a pressure chamber in communication with the inlet opening when communication through the valve is interrupted, said chamber having a seat therein arranged to support the weight of a closure; a closure within said chamber the weight of which at times is supported by said seat, said closure having a by-pass and being responsive to the pressure condition in said chamber; a seat for said by-pass and a cooperating auxiliary valve therefor; an armature controlling the auxiliary valve; means for supporting the auxiliary valve away from its seat after de-energization of the armature; means for energizing and de-energizing the armature.

13. In an electrically controlled valve having main inlet and outlet openings and a chamber for an armature between said openings, the combination with a fluid operated valve adapted to be held in closed position by co-operation of the fluid it controls of means, including an element forming an auxiliary valve and an element forming an armature, so arranged that in response to movement of the armature in a given direction the auxiliary valve is latched in an unseated position and in response to another movement of the armature in said direction the auxiliary valve is unlatched from said position, one of said elements being movable longitudinally with respect to the other, the auxiliary valve at times being supported by the fluid operated valve.

14. An electrically controlled valve combination including a casing having an inlet and an outlet opening and having a pressure chamber in communication with the inlet opening when communication through the valve is interrupted, said chamber having a seat therein arranged to support the weight of a closure; a closure responsive to the pressure condition in said chamber at times supported by said seat, said closure having a by-pass provided with a seat for an auxiliary valve; an auxiliary valve co-operating with the seat of said by-pass and at times supported by said closure; an impact device so mounted in said casing as to impart a hammer blow to said closure to cause the latter to unseat.

15. An electrically controlled valve combination including a valve casing having a chamber with a seat arranged to support the weight of a closure; a closure responsive to the pressure condition in said chamber at times supported by said seat; means including an armature and an auxiliary valve the rotation of at least one of which controls the operation of the closure, the auxiliary valve being supported by the closure in the closed position of the latter; means for energizing and de-energizing the armature.

In testimony whereof, I have hereunto affixed my signature at Los Angeles, California, this 29th day of September, 1926.

EDGAR EARLE LITTLEFIELD.